United States Patent
Mikkelsen et al.

(10) Patent No.: US 9,109,506 B2
(45) Date of Patent: Aug. 18, 2015

(54) METHOD FOR OPERATING A PRESSURE IGNITION ENGINE

(75) Inventors: Svend-Erik Mikkelsen, Værløse (DK); Ton V. W. Janssens, Bagsværd (DK); Pär L. T. Gabrielsson, Helsingborg (SE); Simon Ivar Andersen, Tikøb (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 13/638,573

(22) PCT Filed: Mar. 2, 2011

(86) PCT No.: PCT/EP2011/001021
§ 371 (c)(1),
(2), (4) Date: Dec. 5, 2012

(87) PCT Pub. No.: WO2011/120615
PCT Pub. Date: Oct. 6, 2011

(65) Prior Publication Data
US 2013/0068186 A1    Mar. 21, 2013

(30) Foreign Application Priority Data

Mar. 31, 2010 (DK) .................................. 2010 00273
Jul. 2, 2010 (DK) .................................. 2010 00587

(51) Int. Cl.
*F02B 75/12* (2006.01)
*C10L 1/02* (2006.01)
(Continued)

(52) U.S. Cl.
CPC ................. *F02B 75/12* (2013.01); *C10L 1/026* (2013.01); *F02B 51/02* (2013.01);
(Continued)

(58) Field of Classification Search
CPC ......... F02B 51/02; F02B 75/12; F02M 27/02; F02D 19/0655; F02D 19/0671; F02D 19/0684; F02D 19/081; F02D 19/0694; F02D 19/084; C10L 1/026; Y02T 10/126; Y02T 10/36
USPC .......................... 123/1 A, 1 R, 2, 3, 304, 575
See application file for complete search history.

(56) References Cited

U.S. PATENT DOCUMENTS 4,408,572 A    10/1983  Yoon et al.
4,418,653 A *  12/1983  Yoon ................................. 123/3
(Continued)

FOREIGN PATENT DOCUMENTS

CN        1506565 A        6/2004
CN      101302972 A       11/2008
(Continued)

*Primary Examiner* — Lindsay Low
*Assistant Examiner* — Grant Moubry
(74) *Attorney, Agent, or Firm* — Dickstein Shapiro LLP

(57) ABSTRACT

Method and system for operating a compression engine on ether containing fuel obtained by conversion of a primary fuel based on alcohol comprising the steps and means for: (a) continuously withdrawing the primary fuel based on alcohol from a fuel tank and pressurising the primary fuel based on alcohol in its liquid form to a final engine injection pressure; (b) continuously introducing the pressurized primary fuel based on alcohol into a fuel accumulation chamber; (c) continuously distributing the pressurized primary fuel based on alcohol into pipes connecting the accumulation chamber with fuel injectors of the engine; (d) prior to the fuel injectors continuously converting the pressurised primary fuel based on alcohol to an ether containing fuel by contact with an alcohol dehydration catalyst being arranged in each of the pipes upstream the fuel injectors; (e) continuously injecting the ether containing fuel at injection pressure into the engine; and (f) continuously withdrawing a part of the introduced primary fuel based on alcohol from the accumulation chamber; and (g) depressurising and recycling the withdrawn primary fuel based on alcohol to the fuel tank.

6 Claims, 1 Drawing Sheet

(51) Int. Cl.
*F02B 51/02* (2006.01)
*F02M 27/02* (2006.01)
*F02D 19/06* (2006.01)
*F02D 19/08* (2006.01)

(52) U.S. Cl.
CPC ....... *F02D 19/0655* (2013.01); *F02D 19/0671* (2013.01); *F02D 19/0684* (2013.01); *F02D 19/081* (2013.01); *F02M 27/02* (2013.01); *F02D 19/0694* (2013.01); *F02D 19/084* (2013.01); *Y02T 10/126* (2013.01); *Y02T 10/36* (2013.01)

(56) References Cited

U.S. PATENT DOCUMENTS

| | | | |
|---|---|---|---|
| 4,422,412 A * | 12/1983 | Norton | 123/3 |
| 4,631,266 A * | 12/1986 | Wold et al. | 502/324 |
| 4,876,989 A * | 10/1989 | Karpuk et al. | 123/3 |
| 4,993,386 A * | 2/1991 | Ozasa et al. | 123/25 J |
| 5,097,803 A * | 3/1992 | Galvin | 123/3 |
| 6,245,303 B1 * | 6/2001 | Bentley et al. | 422/629 |
| 6,340,003 B1 * | 1/2002 | Schoubye et al. | 123/3 |
| 6,668,763 B2 * | 12/2003 | Anderson et al. | 123/3 |
| 7,165,512 B2 * | 1/2007 | Hashimoto et al. | 123/3 |
| 7,290,505 B2 * | 11/2007 | Kamio et al. | 123/1 A |
| 7,449,034 B1 * | 11/2008 | Mikkelsen et al. | 44/302 |
| 7,484,495 B2 * | 2/2009 | Kamio et al. | 123/304 |
| 7,682,724 B2 * | 3/2010 | Morgenstern | 429/424 |
| 7,757,676 B2 * | 7/2010 | Cracknell | 123/568.11 |
| 7,770,545 B2 * | 8/2010 | Morgenstern | 123/3 |
| 7,823,570 B2 * | 11/2010 | Cracknell et al. | 123/568.11 |
| 8,100,093 B2 * | 1/2012 | Morgenstern | 123/3 |
| 2004/0047800 A1 * | 3/2004 | Sennoun et al. | 423/652 |
| 2006/0180099 A1 | 8/2006 | Aimoto et al. | |
| 2007/0163537 A1 | 7/2007 | Kamio et al. | |
| 2008/0098985 A1 | 5/2008 | Kamio | |
| 2008/0282998 A1 | 11/2008 | Kuzuoka et al. | |
| 2011/0277734 A1 * | 11/2011 | McCann | 123/585 |

FOREIGN PATENT DOCUMENTS

| | | |
|---|---|---|
| EP | 1 106 803 A2 | 6/2001 |
| JP | 2001-50118 A | 2/2001 |
| JP | 2006-167511 A | 6/2008 |
| JP | 2009-203813 A | 9/2009 |
| JP | 2009-275543 A | 11/2009 |
| JP | 2010-223151 A | 10/2010 |
| RU | 2 205 861 C1 | 6/2003 |
| RU | 2 261 345 C2 | 9/2005 |

* cited by examiner

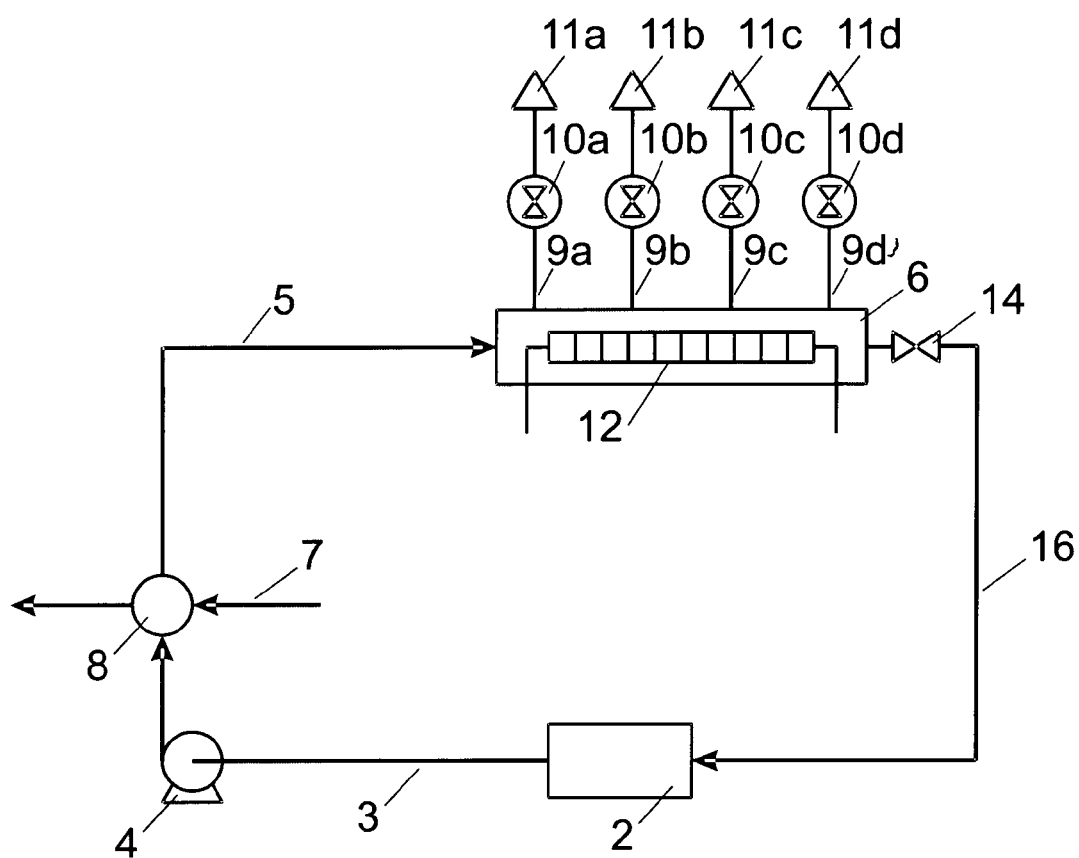

METHOD FOR OPERATING A PRESSURE IGNITION ENGINE

The present invention is directed to a method of operating compression ignition engines and in particular to the operation of those engines with ether containing fuel.

The invention provides furthermore a system for use of the invention.

The most typical example of a compression ignition engine is the Diesel engine operating with high cetane numbered Diesel fuel. To reduce environmental pollution arising from combustion of Diesel fuel several attempts has been made in the past to replace Diesel fuel with alternative fuels having reduced impact on the environment.

Ethers, in particular ethers prepared by dehydration of lower alcohols, such as dimethyl and diethyl ether, have shown to be a superior Diesel fuel.

Use of lower ethers as Diesel fuel has been described in number of publications, e.g. U.S. Pat. Nos. 4,892,561, 5,906,664 and 7,449,034.

Despite of its clean combustion characteristics and high efficiency in a Diesel engine, the main disadvantage of ether based fuels is difficult storage and handling on board of vehicles. At ambient conditions, dimethyl ether is in the gaseous form. To transform the dimethyl ether fuel to its more convenient liquid form the fuel has to be stored and handled under pressure.

Though diethyl ether is in the liquid form at ambient conditions, this ether has a high vapour pressure and has a high risk of explosion when in contact with air.

Modern Diesel engines are provided with a common rail fuel system. The system consists of a high pressure pump and a fuel accumulation chamber storing fuel at high pressure of above 2,000 bars. The accumulation chamber supplies multiple fuel injectors with high pressure fuel. Surplus fuel is withdrawn from the chamber, depressurised and recycled to the fuel tank.

Such a system in connection with use of ether as fuel for the Diesel engine is described in U.S. Pat. No. 6,340,003. By the method of this patent, a primary methanol fuel is pressurised and converted to ether containing Diesel fuel prior to be introduced into the accumulation chamber. The disadvantage of this method arises when ether containing surplus fuel must be removed from the chamber and recycled to a fuel tank, which requires two tanks, one for the alcohol fuel and one for the converted ether containing fuel.

The general object of this invention is to provide a method of converting a primary fuel based on a lower alcohol or a mixture of lower alcohols on board of a vehicle to a secondary fuel containing ether for operating a compression ignition engine being provided with a common rail fuel system without the difficulties of handling and storing of the secondary fuel in particular in vehicles.

In accordance with the above object, this invention is a method of operating a compression engine on ether containing fuel obtained by conversion of a primary fuel based on alcohol, comprising the steps of:
(a) continuously withdrawing the primary fuel based on alcohol from a fuel tank and pressurising the primary fuel based on alcohol in its liquid form to a final engine injection pressure;
(b) continuously introducing the pressurized primary fuel based on alcohol into a fuel accumulation chamber;
(c) continuously distributing the pressurized primary fuel based on alcohol into pipes connecting the accumulation chamber with fuel injectors of the engine;
(d) prior to the fuel injectors continuously converting the pressurised primary fuel based on alcohol to an ether containing fuel by contact with an alcohol dehydration catalyst being arranged in each of the pipes upstream the fuel injectors;
(e) continuously injecting the ether containing fuel at injection pressure into the engine; and
(f) continuously withdrawing a part of the introduced primary fuel based on alcohol from the accumulation chamber; and
(g) depressurising and recycling the withdrawn primary fuel based on alcohol to the fuel tank.

The invention provides furthermore a system for use in the above method, comprising
a compression engine;
a fuel tank adapted to store a primary fuel based on alcohol;
a high pressure pump to pressurize the primary fuel based on alcohol;
an accumulation chamber adapted to receive and to store the pressurized primary fuel based on alcohol;
connection pipes for connecting the accumulation chamber to fuel injectors for fuel injection into the compression engine;
an alcohol dehydration catalyst arranged in each of the connection pipes between the accumulation chamber and the fuel injectors; and
a recirculation line for recirculation surplus of primary fuel based on alcohol from the accumulation chamber to the fuel tank.

The advantage of the method and system according to the invention is that all of the formed ether fuel is instantly used for combustion in the engine and storage of surplus ether fuel is avoided. Surplus of primary fuel based on alcohol is recycled to the fuel tank. FIG. is a schematic illustration of the system of the invention.

Formation of the ether fuel is accomplished by catalytic dehydration of the alcohol to its corresponding ether according to the reaction:

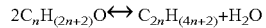

$$2C_nH_{(2n+2)}O \leftrightarrow C_{2n}H_{(4n+2)}+H_2O$$

The dehydration of alcohols to ethers generally is catalyzed by liquid or solid acids, such as sulfuric acid, alumina, silica alumina, a zeolite, sulfonic acid, zirconia-tungstates, alumina phosphates.

Alcohol dehydration is an equilibrium reaction. Thus, equilibrium limitations prevent 100% conversion of the alcohol to ether and water.

At a reaction temperature for e.g. a primary fuel based on ethanol consisting of 95 w % ethanol and 5 w % water, the equilibrium compositions at dehydration temperature between 150 and 350° C. are 9-21 w % ethanol, 19-22 w % $H_2O$ and 59-71 w % diethyl ether. To ensure that the composition remains homogeneous it may be advantageous to include an emulsifier which is substantially unconverted by the dehydration catalyst, either as an additive as the primary fuel is supplied to the accumulation chamber or as an additive to the primary fuel, either in the fuel tank or as the primary fuel is supplied to the vehicle.

Besides methanol and ethanol also mixtures of these and other alcohols are suitable alcohols on which the primary fuel may be based in the present invention.

Preferred alcohol mixtures are a mixture of methanol and ethanol.

Other appropriate primary fuels based on alcohol include methanol as well as blends of alcohols and hydrocarbons, such as gasoline. The latter includes the commercially available E85, typically containing 85% ethanol, 13% gasoline and 2% MTBE (methyl tertiary butyl ether), but also other compositions of alcohol, gasoline and gasoline additives may be used in the invention. While these may be referenced as mixtures of alcohol and hydrocarbons, gasoline and gasoline additives may contain minor amounts of non-hydrocarbons, such as organometallic combustion catalysts. The primary fuels may also comprise water provided that the primary fuel is miscible with water or that an emulsifier is present such that the water is distributed homogeneously in the primary fuel.

For the purpose of the present disclosure, a secondary fuel shall be defined as a fuel mixture formed from a primary fuel as defined above. The secondary fuel contains an ether and is suited for use in compression ignition engines with useful ignition and combustion characteristics. This includes the above mentioned diethyl ether/ethanol/water mixture and dimethyl ether/methanol/water mixtures with a methanol content of up to 20% and water content of up to 20%, as well as similar mixtures which in addition also comprises hydrocarbons such as gasoline. In U.S. Pat. No. 7,449,034 a Diesel fuel containing dimethyl ether, methanol and up to 48% water have been shown to be efficient fuels in compression ignition engines. When the primary fuel contains gasoline (including additives) these will also be contained in the secondary fuel, as no significant conversion of gasoline is considered to take place at the dehydration catalyst.

Within the above ranges of the secondary fuel compositions, the operating conditions of the inventive method will typically be adjusted to an injection temperature of between 150° C. and 350° C. and an injection pressure of between 200 and 2,400 bars. Thereby, conversion of alcohol to a mixture of ether, water and alcohol proceeds in adiabatic manner at appropriate reaction rate in presence of the dehydration catalyst.

In order to rise the temperature of the primary fuel based on alcohol to the dehydration reaction temperature, the fuel must be heated from ambient temperature. This is preferably performed by passing the pressurized fuel through a heat exchanger in indirect heat exchange with hot exhaust gas from the engine, prior to the primary fuel based on alcohol being accumulated in the accumulation chamber.

From the accumulation chamber the primary fuel based on alcohol is passed into each of the pipes connecting the chamber with the fuel injectors and brought in contact with a catalyst catalysing the above discussed alcohol dehydration at an appropriate temperature.

The dehydration catalyst may be arranged in form of catalysed hardware on side wall of the pipes as disclosed in U.S. Pat. No. 6,319,877 or within a reactor chamber being mounted on each of the pipes between the accumulation chamber and the fuel injectors.

In an embodiment of the invention, the catalyst is electrically heated to the reaction temperature.

During start up of the engine, the exhaust gas may be at a temperature, which is insufficient to heat the primary fuel based on alcohol to the necessary reaction temperature. At those conditions, it is preferred to include a further step in the above operation method of additionally heating the pressurized fuel e.g. by means of an electrical heater mounted in the accumulation chamber or an engine heater. Operating conditions in the inventive method will be adjusted to obtain an ether fuel with desired ignition properties.

The above features and aspects of the invention are explained in more detail in the following description by reference to the drawings in which the sole FIGURE schematically shows a system with a common rail fuel injection unit provided with alcohol dehydration reactors for use in the inventive method.

A compression ignition engine with a common rail fuel injection system for use in a specific embodiment of the invention comprises a fuel tank for primary fuel based on alcohol 2 connected through line 3 to a high pressure pump 4. The primary fuel based on alcohol is pressurized in pump 4 to the final injection pressure and passed to accumulation chamber 6 of the common rail system. Prior to being introduced into chamber 6, the pressurized primary fuel based on alcohol is heated by indirect heat exchange with hot exhaust gas 7 from the engine (not shown) in heat exchanger 8.

The pressurised primary fuel based on alcohol is indirectly preheated in heat exchanger 8 to the alcohol dehydration reaction temperature, e.g. 150° C. to 300° C.

During normal engine load cycles, the preheated and pressurised primary fuel based on alcohol is passed continuously to accumulator chamber 6 and distributed through line 9a, 9b, 9c and 9d to fuel injectors 11a, 11b, 11c and 11d.

Prior to introduction into the fuel injectors the primary fuel based on alcohol is dehydrated in presence of a dehydration catalyst arranged in each of lines 9a to 9d. The dehydration catalyst can be in form of catalysed hardware in lines 9a to 9d or as shown in the FIGURE be arranged as fixed bed in reactors 10a, 10b, 10c and 10d. By contact with the dehydration catalyst the primary fuel based on alcohol is partially converted to the above mentioned secondary fuel mixtures comprising ether, alcohol and water, and possibly gasoline.

During start or at low load cycles of the engine, the engine exhaust gas temperature may not be sufficiently high to provide appropriate heat in heat exchanger 8. At those engine cycles the pressurized primary fuel based on alcohol is further heated in the accumulation chamber 8 by means of an electric heater 12 being arranged in the chamber. Alternatively or in addition thereto, the catalyst may be heated by electrical heat (not shown).

As the above described system works continuously, surplus of primary fuel based on alcohol must continuously be withdrawn from chamber 6. This is accomplished by means of valve 14, which is hydraulically or electromagnetically operated.

The withdrawn primary fuel based on alcohol is depressurized 8 in line 16 to fuel tank 2.

The above description is given in the light of engines with common rail injection systems, but those skilled in the art will realise that the invention will also be suitable for use in other types of compression engines.

The above description and the FIGURE is purely schematical, parts and means being otherwise conventional in a compression engine will be obvious to those skilled in the art and are not shown in the FIGURE.

The invention claimed is:

1. Method of operating a compression engine on ether containing fuel obtained by conversion of a primary fuel based on alcohol comprising the steps of:
   (a) providing a common rail fuel system with a fuel accumulation chamber;
   (b) continuously withdrawing the primary fuel based on alcohol from a fuel tank and pressurizing the primary fuel based on alcohol in its liquid form to a final engine injection pressure;
   (c) continuously introducing the pressurized primary fuel based on alcohol into the fuel accumulation chamber;
   (d) continuously distributing the pressurized primary fuel based on alcohol into pipes connecting the fuel accumulation chamber with fuel injectors of the engine;
   (e) prior to the fuel injectors continuously converting at least partially the pressurized primary fuel based on alcohol to an ether containing fuel by contact with an alcohol dehydration catalyst being arranged in each of the pipes upstream the fuel injectors between the fuel accumulation chamber and the fuel injectors;

(f) continuously injecting the ether containing fuel at injection pressure into the engine;

(g) continuously withdrawing a part of the introduced primary fuel based on alcohol from the fuel accumulation chamber; and (h) depressurizing and recycling the withdrawn primary fuel based on alcohol to the fuel tank.

2. The method of claim 1, including a further step of preheating the primary fuel based on alcohol by indirect heat exchange with hot exhaust gas from the engine.

3. The method of claim 1, including a further step of heating the pressurized fuel within the accumulation chamber.

4. The method of claim 1, wherein the primary fuel based on alcohol contains a mixture of different alcohols.

5. The method of claim 1, wherein the primary fuel based on alcohol contains methanol and/or ethanol.

6. The method of claim 1, wherein the primary fuel based on alcohol comprises gasoline.

\* \* \* \* \*